(12) United States Patent
Pan

(10) Patent No.: US 9,143,657 B2
(45) Date of Patent: Sep. 22, 2015

(54) COLOR ENHANCEMENT TECHNIQUE USING SKIN COLOR DETECTION

(75) Inventor: Hao Pan, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 1760 days.

(21) Appl. No.: 11/393,404

(22) Filed: Mar. 30, 2006

(65) Prior Publication Data

US 2007/0171443 A1 Jul. 26, 2007

Related U.S. Application Data

(60) Provisional application No. 60/761,997, filed on Jan. 24, 2006.

(51) Int. Cl.
G09G 5/02 (2006.01)
H04N 1/62 (2006.01)
G06K 9/46 (2006.01)

(52) U.S. Cl.
CPC .......... *H04N 1/62* (2013.01); *G06K 9/4652* (2013.01); *H04N 1/628* (2013.01)

(58) Field of Classification Search
None
See application file for complete search history.

(56) References Cited

U.S. PATENT DOCUMENTS

| | | | |
|---|---|---|---|
| 3,329,474 A | 7/1967 | Harris et al. |
| 3,375,052 A | 3/1968 | Kosanke et al. |
| 3,428,743 A | 2/1969 | Hanlon |
| 3,439,348 A | 4/1969 | Harris et al. |
| 3,499,700 A | 3/1970 | Harris et al. |
| 3,503,670 A | 3/1970 | Kosanke et al. |
| 3,554,632 A | 1/1971 | Chitayat |
| 3,947,227 A | 3/1976 | Granger et al. |
| 4,012,116 A | 3/1977 | Yevick |
| 4,110,794 A | 8/1978 | Lester et al. |
| 4,170,771 A | 10/1979 | Bly |
| 4,187,519 A | 2/1980 | Vitols et al. |
| 4,384,336 A | 5/1983 | Frankle et al. |
| 4,385,806 A | 5/1983 | Fergason |
| 4,410,238 A | 10/1983 | Hanson |
| 4,441,791 A | 4/1984 | Hornbeck |

(Continued)

FOREIGN PATENT DOCUMENTS

| | | |
|---|---|---|
| EP | 0 732 669 A1 | 9/1996 |
| EP | 0 829 747 A1 | 3/1998 |

(Continued)

OTHER PUBLICATIONS

Ngai-Man Cheung, et al., "Configurable entropy coding scheme for H.26L," ITU-Telecommunications Standardization Sector, Study Group 16 Question 6 Video Coding Experts Group (VCEG), Twelfth Meeting: Eibsee, Germany, Jan. 9-12, 2001, pp. 1-11.

(Continued)

*Primary Examiner* — Edward Martello
(74) *Attorney, Agent, or Firm* — Chernoff Vilhauer McClung & Stenzel, LLP

(57) ABSTRACT

A method for enhancing the color of an image to be displayed includes receiving an input image having a plurality of pixels where each of the pixels has a plurality of color components. The input image is filtered using a spatial filter in such a manner that the lower frequency content of the input image is enhanced in such a manner that the dynamic range of the lower frequency content is increased. The filtered image is modified such that the higher frequency content of the input image is used to modify the filtered image.

8 Claims, 9 Drawing Sheets

The overall block diagram of the proposed algorithm

(56) References Cited

U.S. PATENT DOCUMENTS

| | | | |
|---|---|---|---|
| 4,516,837 | A | 5/1985 | Soref et al. |
| 4,540,243 | A | 9/1985 | Fergason |
| 4,562,433 | A | 12/1985 | Biferno |
| 4,574,364 | A | 3/1986 | Tabata et al. |
| 4,611,889 | A | 9/1986 | Buzak |
| 4,648,691 | A | 3/1987 | Oguchi et al. |
| 4,649,425 | A | 3/1987 | Pund |
| 4,682,270 | A | 7/1987 | Whitehead et al. |
| RE32,521 | E | 10/1987 | Fergason |
| 4,715,010 | A | 12/1987 | Inoue et al. |
| 4,719,507 | A | 1/1988 | Bos |
| 4,755,038 | A | 7/1988 | Baker |
| 4,758,818 | A | 7/1988 | Vatne |
| 4,766,430 | A | 8/1988 | Gillette et al. |
| 4,834,500 | A | 5/1989 | Hilsum et al. |
| 4,862,270 | A | 8/1989 | Nishio |
| 4,862,496 | A | 8/1989 | Kelly et al. |
| 4,885,783 | A | 12/1989 | Whitehead et al. |
| 4,888,690 | A | 12/1989 | Huber |
| 4,910,413 | A | 3/1990 | Tamune |
| 4,917,452 | A | 4/1990 | Liebowitz |
| 4,918,534 | A | 4/1990 | Lam et al. |
| 4,933,754 | A | 6/1990 | Reed et al. |
| 4,954,789 | A | 9/1990 | Sampsell |
| 4,958,915 | A | 9/1990 | Okada et al. |
| 4,969,717 | A | 11/1990 | Mallinsoh |
| 4,981,838 | A | 1/1991 | Whitehead |
| 4,991,924 | A | 2/1991 | Shankar et al. |
| 5,012,274 | A | 4/1991 | Dolgoff |
| 5,013,140 | A | 5/1991 | Healey et al. |
| 5,074,647 | A | 12/1991 | Fergason et al. |
| 5,075,789 | A | 12/1991 | Jones et al. |
| 5,083,199 | A | 1/1992 | Borner |
| 5,122,791 | A | 6/1992 | Gibbons et al. |
| 5,128,782 | A | 7/1992 | Wood |
| 5,138,449 | A | 8/1992 | Kerpchar |
| 5,144,292 | A | 9/1992 | Shiraishi et al. |
| 5,164,829 | A | 11/1992 | Wada |
| 5,168,183 | A | 12/1992 | Whitehead |
| 5,187,603 | A | 2/1993 | Bos |
| 5,202,897 | A | 4/1993 | Whitehead |
| 5,206,633 | A | 4/1993 | Zalph |
| 5,214,758 | A | 5/1993 | Ohba et al. |
| 5,222,209 | A | 6/1993 | Murata et al. |
| 5,224,178 | A | 6/1993 | Madden et al. |
| 5,247,366 | A | 9/1993 | Ginosar et al. |
| 5,256,676 | A | 10/1993 | Hider et al. |
| 5,293,258 | A | 3/1994 | Dattilo |
| 5,300,942 | A | 4/1994 | Dolgoff |
| 5,305,146 | A | 4/1994 | Nakagaki et al. |
| 5,311,217 | A | 5/1994 | Guerin et al. |
| 5,313,225 | A | 5/1994 | Miyadera |
| 5,313,454 | A | 5/1994 | Bustini et al. |
| 5,317,400 | A | 5/1994 | Gurley et al. |
| 5,337,068 | A | 8/1994 | Stewart et al. |
| 5,339,382 | A | 8/1994 | Whitehead |
| 5,357,369 | A | 10/1994 | Pilling et al. |
| 5,359,345 | A | 10/1994 | Hunter |
| 5,369,266 | A | 11/1994 | Nohda et al. |
| 5,369,432 | A | 11/1994 | Kennedy |
| 5,386,253 | A | 1/1995 | Fielding |
| 5,394,195 | A | 2/1995 | Herman |
| 5,395,755 | A | 3/1995 | Thorpe et al. |
| 5,416,496 | A | 5/1995 | Wood |
| 5,422,680 | A | 6/1995 | Lagoni et al. |
| 5,426,312 | A | 6/1995 | Whitehead |
| 5,436,755 | A | 7/1995 | Guerin |
| 5,450,498 | A | 9/1995 | Whitehead |
| 5,456,255 | A | 10/1995 | Abe et al. |
| 5,461,397 | A | 10/1995 | Zhang et al. |
| 5,471,225 | A | 11/1995 | Parks |
| 5,471,228 | A | 11/1995 | Ilcisin et al. |
| 5,477,274 | A | 12/1995 | Akiyoshi |
| 5,481,637 | A | 1/1996 | Whitehead |
| 5,537,128 | A | 7/1996 | Keene et al. |
| 5,570,210 | A | 10/1996 | Yoshida et al. |
| 5,579,134 | A | 11/1996 | Lengyel |
| 5,580,791 | A | 12/1996 | Thorpe et al. |
| 5,592,193 | A | 1/1997 | Chen |
| 5,617,112 | A | 4/1997 | Yoshida et al. |
| 5,642,015 | A | 6/1997 | Whitehead et al. |
| 5,642,128 | A | 6/1997 | Inoue |
| D381,355 | S | 7/1997 | Frank-Braun |
| 5,650,880 | A | 7/1997 | Shuter et al. |
| 5,652,672 | A | 7/1997 | Huignard et al. |
| 5,661,839 | A | 8/1997 | Whitehead |
| 5,682,075 | A | 10/1997 | Bolleman et al. |
| 5,682,443 | A * | 10/1997 | Gouch et al. .................. 382/254 |
| 5,684,354 | A | 11/1997 | Gleckman |
| 5,689,283 | A | 11/1997 | Shirochi |
| 5,715,347 | A | 2/1998 | Whitehead |
| 5,717,421 | A | 2/1998 | Katakura et al. |
| 5,717,422 | A | 2/1998 | Fergason |
| 5,729,242 | A | 3/1998 | Margerum et al. |
| 5,748,164 | A | 5/1998 | Handschy et al. |
| 5,751,264 | A | 5/1998 | Cavallerano et al. |
| 5,754,159 | A | 5/1998 | Wood et al. |
| 5,767,828 | A | 6/1998 | McKnight |
| 5,767,837 | A | 6/1998 | Hara |
| 5,774,599 | A | 6/1998 | Muka et al. |
| 5,784,181 | A | 7/1998 | Loiseaux et al. |
| 5,796,382 | A | 8/1998 | Beeteson |
| 5,809,169 | A | 9/1998 | Rezzouk et al. |
| 5,854,662 | A | 12/1998 | Yuyama et al. |
| 5,886,681 | A | 3/1999 | Walsh et al. |
| 5,889,567 | A | 3/1999 | Swanson et al. |
| 5,892,325 | A | 4/1999 | Gleckman |
| 5,901,266 | A | 5/1999 | Whitehead |
| 5,912,651 | A | 6/1999 | Bitzakidis et al. |
| 5,939,830 | A | 8/1999 | Praiswater |
| 5,940,057 | A | 8/1999 | Lien et al. |
| 5,959,777 | A | 9/1999 | Whitehead |
| 5,969,704 | A | 10/1999 | Green et al. |
| 5,978,142 | A | 11/1999 | Blackham et al. |
| 5,986,628 | A | 11/1999 | Tuenge et al. |
| 5,991,456 | A | 11/1999 | Rahman et al. |
| 5,995,070 | A | 11/1999 | Kitada |
| 5,999,307 | A | 12/1999 | Whitehead et al. |
| 6,008,929 | A | 12/1999 | Akimoto et al. |
| 6,024,462 | A | 2/2000 | Whitehead |
| 6,025,583 | A | 2/2000 | Whitehead |
| 6,043,591 | A | 3/2000 | Gleckman |
| 6,050,704 | A | 4/2000 | Park |
| 6,064,784 | A | 5/2000 | Whitehead et al. |
| 6,067,645 | A | 5/2000 | Yamamoto et al. |
| 6,079,844 | A | 6/2000 | Whitehead et al. |
| 6,111,559 | A | 8/2000 | Motomura et al. |
| 6,111,622 | A | 8/2000 | Abileah |
| 6,120,588 | A | 9/2000 | Jacobson |
| 6,120,839 | A | 9/2000 | Comiskey et al. |
| 6,129,444 | A | 10/2000 | Tognoni |
| 6,160,595 | A | 12/2000 | Kishimoto |
| 6,172,798 | B1 | 1/2001 | Albert et al. |
| 6,211,851 | B1 | 4/2001 | Lien et al. |
| 6,215,920 | B1 | 4/2001 | Whitehead et al. |
| 6,232,948 | B1 | 5/2001 | Tsuchi |
| 6,243,068 | B1 | 6/2001 | Evanicky et al. |
| 6,267,850 | B1 | 7/2001 | Bailey et al. |
| 6,268,843 | B1 | 7/2001 | Arakawa |
| 6,276,801 | B1 | 8/2001 | Fielding |
| 6,300,931 | B1 | 10/2001 | Someya et al. |
| 6,300,932 | B1 | 10/2001 | Albert |
| 6,304,365 | B1 | 10/2001 | Whitehead |
| 6,323,455 | B1 | 11/2001 | Bailey et al. |
| 6,323,989 | B1 | 11/2001 | Jacobson et al. |
| 6,327,072 | B1 | 12/2001 | Comiskey et al. |
| RE37,594 | E | 3/2002 | Whitehead |
| 6,359,662 | B1 | 3/2002 | Walker |
| 6,377,383 | B1 | 4/2002 | Whitehead et al. |
| 6,384,979 | B1 | 5/2002 | Whitehead et al. |
| 6,400,436 | B1 | 6/2002 | Komatsu |
| 6,414,664 | B1 | 7/2002 | Conover et al. |
| 6,418,253 | B2 | 7/2002 | Whitehead |
| 6,424,369 | B1 | 7/2002 | Adair et al. |

(56) References Cited

U.S. PATENT DOCUMENTS

| | | |
|---|---|---|
| 6,428,189 B1 | 8/2002 | Hochstein |
| 6,435,654 B1 | 8/2002 | Wang et al. |
| 6,437,921 B1 | 8/2002 | Whitehead |
| 6,439,731 B1 | 8/2002 | Johnson et al. |
| 6,448,944 B2 | 9/2002 | Ronzani et al. |
| 6,448,951 B1 | 9/2002 | Sakaguchi et al. |
| 6,448,955 B1 | 9/2002 | Evanicky et al. |
| 6,452,734 B1 | 9/2002 | Whitehead et al. |
| 6,483,643 B1 | 11/2002 | Zuchowski |
| 6,507,327 B1 | 1/2003 | Atherton et al. |
| 6,545,677 B2 | 4/2003 | Brown |
| 6,559,827 B1 | 5/2003 | Mangerson |
| 6,573,928 B1 | 6/2003 | Jones et al. |
| 6,574,025 B2 | 6/2003 | Whitehead et al. |
| 6,590,561 B1 | 7/2003 | Kabel et al. |
| 6,597,339 B1 | 7/2003 | Ogawa |
| 6,608,614 B1 | 8/2003 | Johnson |
| 6,624,828 B1 | 9/2003 | Dresevic et al. |
| 6,657,607 B1 | 12/2003 | Evanicky et al. |
| 6,680,834 B2 | 1/2004 | Williams |
| 6,690,383 B1 | 2/2004 | Braudaway et al. |
| 6,697,110 B1 | 2/2004 | Jaspers et al. |
| 6,700,559 B1 | 3/2004 | Tanaka et al. |
| 6,753,876 B2 | 6/2004 | Brooksby et al. |
| 6,788,280 B2 | 9/2004 | Ham |
| 6,791,520 B2 | 9/2004 | Choi |
| 6,803,901 B1 | 10/2004 | Numao |
| 6,816,141 B1 | 11/2004 | Fergason |
| 6,816,142 B2 | 11/2004 | Oda et al. |
| 6,816,262 B1 | 11/2004 | Slocum et al. |
| 6,828,816 B2 | 12/2004 | Ham |
| 6,834,125 B2 | 12/2004 | Woodell et al. |
| 6,846,098 B2 | 1/2005 | Bourdelais et al. |
| 6,856,449 B2 | 2/2005 | Winkler et al. |
| 6,862,012 B1 | 3/2005 | Funakoshi et al. |
| 6,864,916 B1 | 3/2005 | Nayar et al. |
| 6,885,369 B2 | 4/2005 | Tanahashi et al. |
| 6,891,672 B2 | 5/2005 | Whitehead et al. |
| 6,900,796 B2 | 5/2005 | Yasunishi et al. |
| 6,932,477 B2 | 8/2005 | Stanton |
| 6,937,775 B2 * | 8/2005 | Gindele et al. ............... 382/254 |
| 6,954,193 B1 | 10/2005 | Andrade et al. |
| 6,975,369 B1 | 12/2005 | Burkholder |
| 7,002,546 B1 | 2/2006 | Stuppi et al. |
| 7,113,163 B2 | 9/2006 | Nitta et al. |
| 7,113,164 B1 | 9/2006 | Kurihara |
| 7,123,222 B2 | 10/2006 | Borel et al. |
| 7,161,577 B2 | 1/2007 | Hirakata et al. |
| 2001/0005192 A1 | 6/2001 | Walton et al. |
| 2001/0013854 A1 | 8/2001 | Ogoro |
| 2001/0024199 A1 | 9/2001 | Hughes et al. |
| 2001/0035853 A1 | 11/2001 | Hoelen et al. |
| 2001/0038736 A1 | 11/2001 | Whitehead |
| 2001/0048407 A1 | 12/2001 | Yasunishi et al. |
| 2001/0052897 A1 | 12/2001 | Nakano et al. |
| 2002/0003520 A1 | 1/2002 | Aoki |
| 2002/0003522 A1 | 1/2002 | Baba et al. |
| 2002/0008694 A1 | 1/2002 | Miyachi et al. |
| 2002/0031257 A1 | 3/2002 | Kato |
| 2002/0033783 A1 | 3/2002 | Koyama |
| 2002/0036650 A1 | 3/2002 | Kasahara et al. |
| 2002/0044116 A1 | 4/2002 | Tagawa et al. |
| 2002/0057238 A1 | 5/2002 | Nitta et al. |
| 2002/0057253 A1 | 5/2002 | Lim et al. |
| 2002/0063963 A1 | 5/2002 | Whitehead et al. |
| 2002/0067325 A1 | 6/2002 | Choi |
| 2002/0067332 A1 | 6/2002 | Hirakata et al. |
| 2002/0070914 A1 | 6/2002 | Bruning et al. |
| 2002/0093521 A1 | 7/2002 | Daly et al. |
| 2002/0105709 A1 | 8/2002 | Whitehead et al. |
| 2002/0118887 A1 | 8/2002 | Gindele |
| 2002/0135553 A1 | 9/2002 | Nagai et al. |
| 2002/0149574 A1 | 10/2002 | Johnson et al. |
| 2002/0149575 A1 | 10/2002 | Moon |
| 2002/0154088 A1 | 10/2002 | Nishimura |
| 2002/0159002 A1 | 10/2002 | Chang |
| 2002/0159692 A1 | 10/2002 | Whitehead |
| 2002/0162256 A1 | 11/2002 | Wardle et al. |
| 2002/0171617 A1 | 11/2002 | Fuller |
| 2002/0175286 A1 | 11/2002 | Murguia |
| 2002/0175907 A1 | 11/2002 | Sekiya et al. |
| 2002/0180733 A1 | 12/2002 | Colmenarez et al. |
| 2002/0190940 A1 | 12/2002 | Itoh et al. |
| 2003/0012448 A1 | 1/2003 | Kimmel et al. |
| 2003/0026494 A1 | 2/2003 | Woodell et al. |
| 2003/0035578 A1 * | 2/2003 | Dupin et al. ................... 382/167 |
| 2003/0043394 A1 | 3/2003 | Kuwata et al. |
| 2003/0048393 A1 | 3/2003 | Sayag |
| 2003/0053689 A1 | 3/2003 | Watanabe et al. |
| 2003/0072496 A1 | 4/2003 | Woodell et al. |
| 2003/0090455 A1 | 5/2003 | Daly |
| 2003/0107538 A1 | 6/2003 | Asao et al. |
| 2003/0108245 A1 * | 6/2003 | Gallagher et al. ............. 382/228 |
| 2003/0108250 A1 * | 6/2003 | Luo et al. ....................... 382/263 |
| 2003/0112391 A1 | 6/2003 | Jang et al. |
| 2003/0128337 A1 | 7/2003 | Jaynes et al. |
| 2003/0132905 A1 | 7/2003 | Lee et al. |
| 2003/0142118 A1 | 7/2003 | Funamoto et al. |
| 2003/0169247 A1 | 9/2003 | Kawabe et al. |
| 2003/0179221 A1 | 9/2003 | Nitta et al. |
| 2003/0197709 A1 | 10/2003 | Shimazaki et al. |
| 2004/0012551 A1 | 1/2004 | Ishii |
| 2004/0037460 A1 * | 2/2004 | Luo et al. ....................... 382/165 |
| 2004/0041782 A1 | 3/2004 | Tachibana |
| 2004/0051724 A1 | 3/2004 | Elliott et al. |
| 2004/0057017 A1 | 3/2004 | Childers et al. |
| 2004/0239587 A1 | 12/2004 | Murata et al. |
| 2004/0252907 A1 * | 12/2004 | Ito ................................. 382/260 |
| 2004/0263450 A1 | 12/2004 | Lee et al. |
| 2005/0073495 A1 | 4/2005 | Harbers et al. |
| 2005/0088403 A1 | 4/2005 | Yamazaki |
| 2005/0105147 A1 * | 5/2005 | Gruzdev et al. ............... 358/518 |
| 2005/0123214 A1 | 6/2005 | Takahira |
| 2005/0157298 A1 | 7/2005 | Evanicky et al. |
| 2005/0175227 A1 * | 8/2005 | Paschalakis ................... 382/128 |
| 2005/0190164 A1 | 9/2005 | Velthoven et al. |
| 2005/0200295 A1 | 9/2005 | Lim et al. |
| 2005/0225561 A1 | 10/2005 | Higgins et al. |
| 2005/0225574 A1 | 10/2005 | Brown et al. |
| 2005/0259064 A1 | 11/2005 | Sugino et al. |
| 2005/0281458 A1 * | 12/2005 | Adams et al. ................. 382/162 |
| 2006/0071936 A1 | 4/2006 | Leyvi et al. |
| 2006/0104508 A1 | 5/2006 | Daly et al. |
| 2006/0120598 A1 * | 6/2006 | Takahashi et al. ............. 382/167 |
| 2006/0208998 A1 | 9/2006 | Okishiro et al. |
| 2006/0280333 A1 | 12/2006 | Ikeda et al. |
| 2007/0009167 A1 | 1/2007 | Dance et al. |
| 2007/0052636 A1 | 3/2007 | Kalt et al. |
| 2008/0025634 A1 | 1/2008 | Border et al. |
| 2008/0088560 A1 | 4/2008 | Bae et al. |

FOREIGN PATENT DOCUMENTS

| | | |
|---|---|---|
| EP | 0 606 162 B1 | 11/1998 |
| EP | 0912047 | 4/1999 |
| EP | 0 963 112 A1 | 12/1999 |
| EP | 1061499 | 12/2000 |
| EP | 1168243 | 1/2002 |
| EP | 1 202 244 A1 | 5/2002 |
| EP | 1 206 130 A1 | 5/2002 |
| EP | 1 313 066 A1 | 5/2003 |
| EP | 1 316 919 A2 | 6/2003 |
| EP | 1 453 002 | 9/2004 |
| EP | 1 453 030 A1 | 9/2004 |
| FR | 2 611 389 | 2/1987 |
| GB | 2 388 737 | 11/2003 |
| JP | 64-10299 | 1/1989 |
| JP | 1-98383 | 4/1989 |
| JP | 3-71111 | 3/1991 |
| JP | 3-198026 | 8/1991 |
| JP | 5-66501 | 3/1993 |
| JP | 5-80716 | 4/1993 |
| JP | 5-273523 | 10/1993 |
| JP | 5-289044 | 11/1993 |

(56) References Cited

FOREIGN PATENT DOCUMENTS

| | | |
|---|---|---|
| JP | 6-247623 | 9/1994 |
| JP | 6-313018 | 11/1994 |
| JP | 7-121120 | 5/1995 |
| JP | 9-244548 | 9/1997 |
| JP | 10-508120 | 8/1998 |
| JP | 11-052412 | 2/1999 |
| JP | 11-146219 | 5/1999 |
| JP | 2002-099250 | 4/2000 |
| JP | 2000-206488 | 7/2000 |
| JP | 2000-275995 | 10/2000 |
| JP | 2000-321571 | 11/2000 |
| JP | 2001-142409 | 5/2001 |
| JP | 2002-83293 | 3/2002 |
| JP | 2002-091385 | 3/2002 |
| JP | 2003-196653 | 7/2003 |
| JP | 2003-204450 | 7/2003 |
| JP | 2003-230010 | 8/2003 |
| JP | 3523170 | 2/2004 |
| JP | 2004-294540 | 10/2004 |
| KR | 10-2004-0084777 | 10/2004 |
| TW | 406206 | 9/2000 |
| WO | WO 91/15843 | 10/1991 |
| WO | WO 93/20660 | 10/1993 |
| WO | WO 96/33483 | 10/1996 |
| WO | WO 98/08134 | 2/1998 |
| WO | WO 00/75720 | 12/2000 |
| WO | WO 01/69584 | 9/2001 |
| WO | WO 02/03687 | 1/2002 |
| WO | WO 02/079862 | 10/2002 |
| WO | WO 03/077013 | 9/2003 |
| WO | WO 2004/013835 | 2/2004 |

OTHER PUBLICATIONS

Paul E. Debevec and Jitendra Malik, "Recovering High Dynamic Range Radiance Maps from Photographs," Proceedings of SIGGRAPH 97, Computer Graphics Proceedings, Annual Conference Series, pp. 369-378 (Aug. 1997, Los Angeles, California). Addison Wesley, Edited by Turner Whitted. ISBN 0-89791-896-7.

Office Action for the Japanese patent application No. 2007-014256 from the Japanese Patent Office mailing date of Jan. 6, 2009, 6 pages.

* cited by examiner

Two adjacent colors in the hue-saturation color wheel are not adjacent in the wheel after pixel based color enhancement.

The actual skin color region and the skin region defined by a pixel-based method in a color wheel.

The 3D plot of a 33x33x33 skin color lookup table (left) and three 2D slices of the 3D LUT with Blue=0, 128, and 255, respectively (right).

The block diagram of the image-driven nonlinear lowpass filter

The flowchart of color enhancement using skin color likelihood map

The input-output relationship of a coring process

An example of the interface of the possible embodiment with two independent sliders ("Flesh Tone Saturation" and "Non-Flesh Tone Saturation") for separately adjusting the saturation levels of skin colors and non-skin colors, respectively.

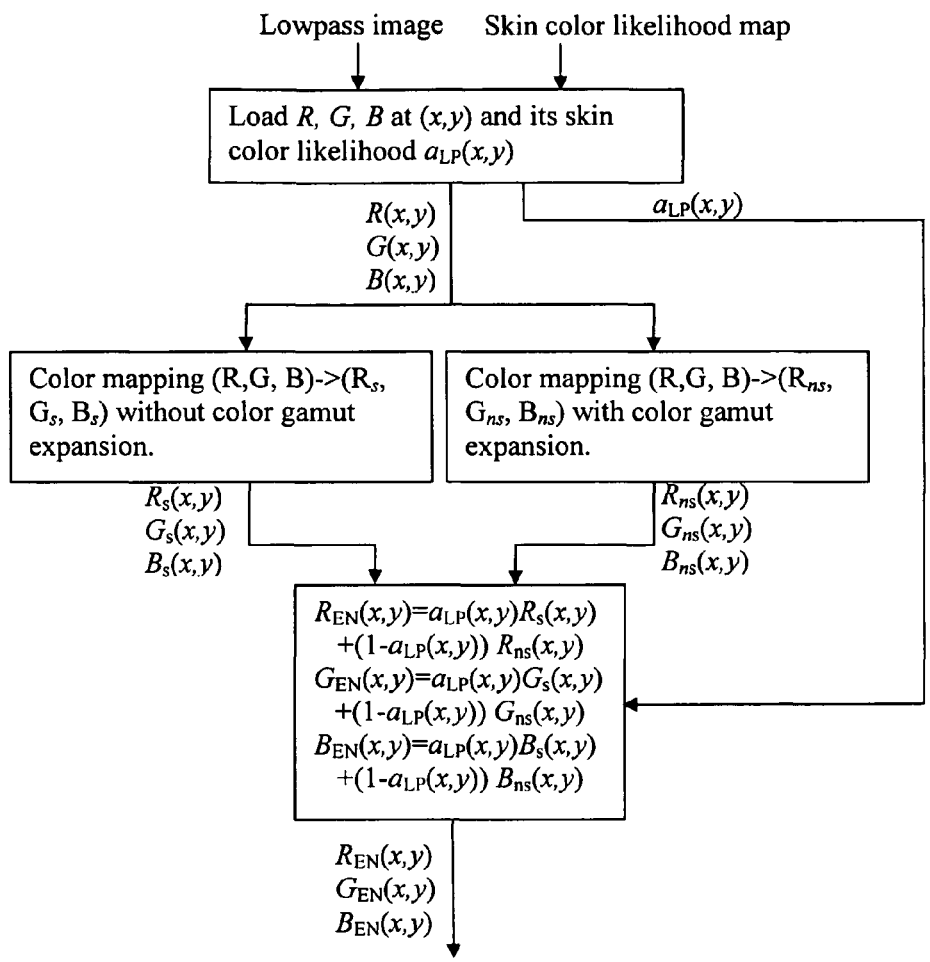
Figure 9 The flowchart of color gamut mapping applied to the lowpass image using skin color likelihood map

COLOR ENHANCEMENT TECHNIQUE USING SKIN COLOR DETECTION

CROSS-REFERENCE TO RELATED APPLICATIONS

This application claims the benefit of U.S. Provisional App. No. 60/761,997, filed Jan. 24, 2006.

BACKGROUND OF THE INVENTION

The present invention relates to image enhancement.

The HSV (hue, saturation, value), or HSB (hue, saturation, brightness) model of the color space model facilitates a more intuitive modification of the colors of an image than changing the colors of an image based directly upon the modification of three primary colors model, i.e. R, G, and B. The RGB color space has the shape of a cube while the HSV color space has the shape of a hexagonal cone. The HSV cone is a non-linear transformation of the RGB cube and at times it is referred to as a perceptual model. 'Perceptual' means the attributes that are more akin to the way in which human-beings think of color.

HSV model facilitates modification of the range or gamut of an RGB display device using the perceptually based variables, i.e. hue, saturation and value/brightness. The HSV model is based on polar coordinates (r, e, z) rather than Cartesians coordinates used in the RGB model. Hue, or tint or tone, is represented as an angle about the z axis, ranging from 0° through 360°. Vertices of the hexagon are separated by 60° increment. Red is at H=0°, Yellow at H=60°, Green at H=120°, and Cyan at H=180°. Complementary colors are 180° spaced apart from each other. Distance from the z axis represents saturation (S): the amount of color present. S varies from 0 to 1. It is represented in this model as the ratio of the purity of a hue. S=1 represents maximum purity of this hue. A hue is said to be one-quarter purity at S=0.25. At S=0, the gray scale is resulted. V, value of HSV, varies from 0 at the apex of the hexcone to 1 at the bottom of the hexcone. V=0 represents blackness. With V=1, color has his maximum intensity. When V=1 and S=1, we have the pure hue. Whiteness is obtained at the location of V=1 and S=0.

Most existing current color enhancement techniques typically boosts saturation of colors while keeping the colors' hue substantially unchanged. In the hue-saturation color wheel such as the one shown in FIG. 1, a typical color enhancement technique moves colors outward on the radial direction as shown by the arrows. Essentially, the color enhancement algorithm increases the input images' dynamic range by increasing the saturation of the pixels.

The techniques used to enhance the color enhancement of an image are based upon modification of individual pixels. When the color of a pixel is enhanced to a new color, the conversion from the old color to the new color for each pixel is a predetermined fixed adjustment for the entire image or for the entire video.

By way of example, televisions have built-in color enhancement techniques to enhance unsaturated colors in certain content and let viewers set their color preferences. Because the human eye is very sensitive to the skin color, it is important for a color enhancement technique to render skin colors properly. It is also desirable for a color enhancement technique to separately adjust skin colors and non-skin colors using different characteristics.

Some color enhancement techniques have the capability of protecting skin colors. These techniques are typically are pixel-based. When the color of a pixel is enhanced to a new color, the conversion from the old color to the new color is fixed, and is not affected by other pixels. Because pixel-based color enhancement techniques with skin color protection cannot overcome the issue that the colors of skin and non-skin are highly overlapped, these techniques cannot effectively separately enhance skin and non-skin, and thus they can only protect all skin colors in the image not to be enhanced.

The pixel-based algorithms do not work effectively. Specifically, to avoid generating visible contouring artifacts in the areas of an image where skin and neighboring non-skin colors are mixed, both the skin color region in the color space and the gradual transition region between the skin color region and the non-skin color region have to be set very wide. Typically, the skin color and transition regions cover nearly half of the color gamut, as illustrated in FIG. 2. On the other hand, some true skin colors are missed in the skin color region and therefore remain unprotected. Consequently, many non-skin colors are improperly protected while many skin colors are improperly enhanced by the enhancement techniques.

BRIEF DESCRIPTION OF THE SEVERAL VIEWS OF THE DRAWINGS

FIG. 9 illustrates a color gamut mapping technique.

DETAILED DESCRIPTION OF PREFERRED EMBODIMENT

Figure 1:
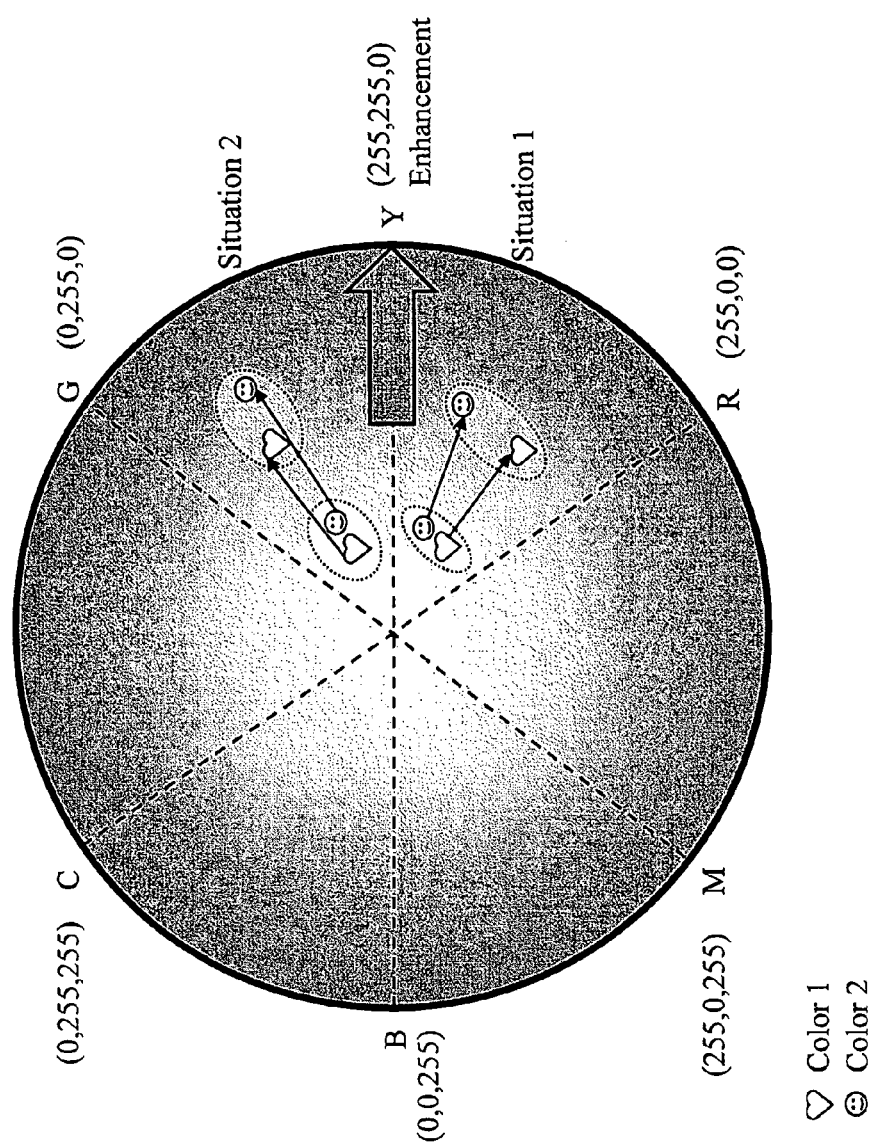
FIG. 1 illustrates two adjacent colors in the hue-saturation color wheel that are not adjacent in the wheel after color enhancement.
Figure 2:
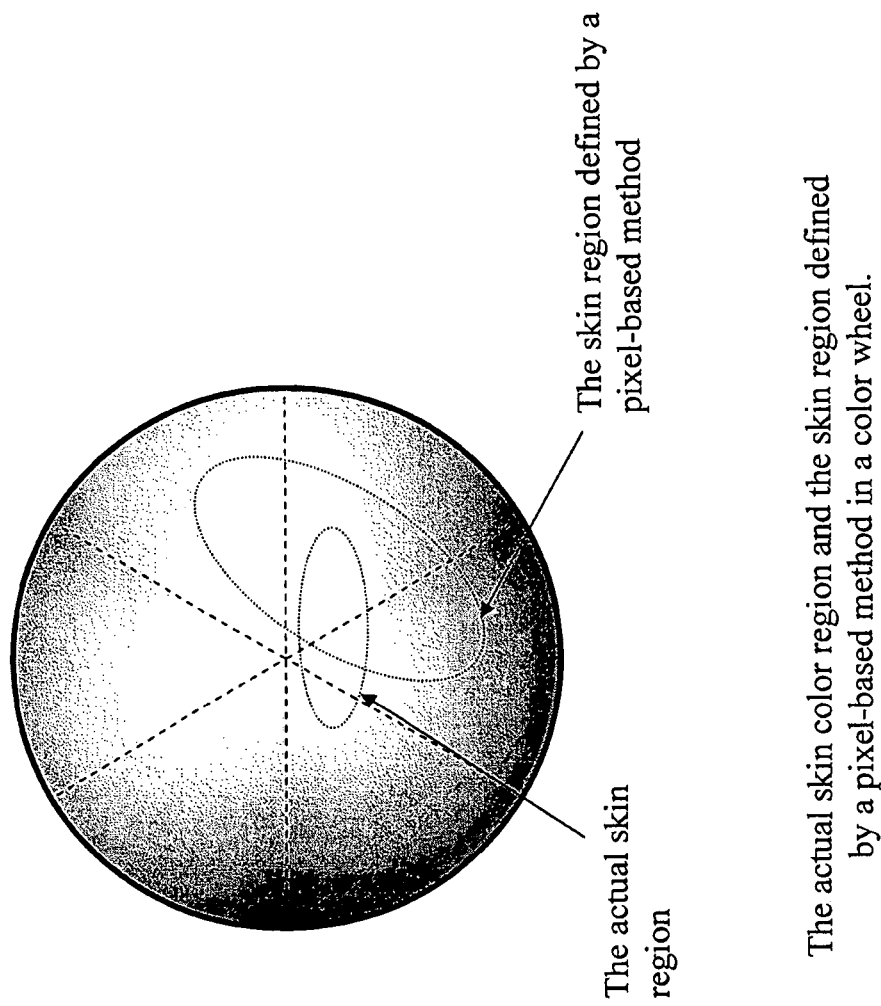
FIG. 2 illustrates the actual skin color region and the skin region defined by a pixel based technique in a color wheel.

An observation was made that a typical pixel based color enhancement technique results in two similar colors before enhancement being modified to different values that are significantly less similar after enhancement. FIG. 1 illustrates two different situations. Situation 1 illustrates the case when two colors are similar but have different hues, and situation 2 illustrates the case when two colors have the same hue and similar saturations.

In both situations, the two colors are close to each other in the color wheel before color enhancement. The two colors are spaced significantly apart from each other in the color wheel after color enhancement, indicating that the two enhanced colors are less similar after enhancement than they were before enhancement.

Single pixel-based color enhancement techniques also enhance artifacts while it enhances colors. The pixels in spatial flat areas of the non-enhanced image tend to have similar colors, and the differences among the similar colors are not very visible to the viewer. Because the pixel-based color enhancement techniques enlarge the differences of similar colors, the resulting differences of the enhanced image may become very visible, and consequently a flat area of the image before enhancement may not be very flat anymore after enhancement. Specifically, pixel-based color enhancement techniques are prone to amplifying noise that is otherwise generally unobservable in the flat area to become readily observable after color enhancement. Also, the pixel-based color enhancement technique tends to amplify and generate quantization artifacts in the smooth regions before enhancement that become relatively rough after enhancement. In addition, amplifying compression artifacts that are generally unobservable in the non-enhanced image become generally noticeable after enhancement. The compression artifacts include, for example, contours, which are typically due to insufficient bit-depth, blocky artifacts, which are common for block-based compression schemes, and ringing artifacts, which are due to loss of high frequency caused by compression.

In order to reduce the artifacts resulting from image enhancement, a modified technique may incorporate spatial information with the color enhancement. In addition, the spatial information may be obtained using multi-channel or two-channel decomposition of the image. More specifically, the preferred technique may decomposes an image into a base image and a residual image. The base image may incorporate a pixel-based color enhancement technique. The color enhanced base image and the non-enhanced residual image are then combined back into a single image.

The color enhancement technique for the base image results in an increased dynamic range for an image, and as a result tends to increase the noise and artifacts that are in the image, which are generally not observable at the lower dynamic range. Accordingly, it is desirable to reduce the generation of artifacts while enhancing the color of the image with an increased dynamic range. While decreasing the generation of artifacts in the increased dynamic range image, the technique should also preserve image details which are generally high frequency in nature and akin to 'noise'.

Figure 3:
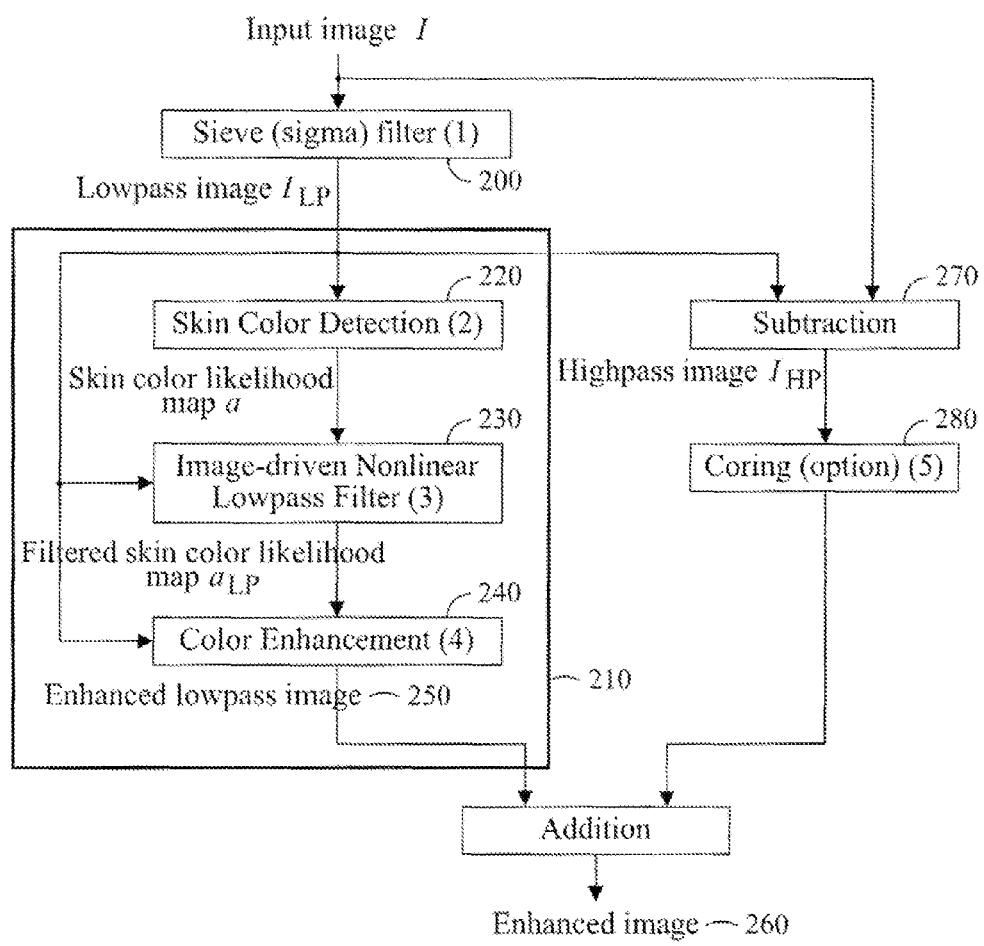
FIG. 3 illustrates a block diagram of the proposed technique.

The overall block-diagram of the preferred system is shown in FIG. 3. To reduce enhancing noise and artifacts while enhancing colors, the technique uses two-channel decomposition. Specifically, the input image is first decomposed into lowpass (e.g., base) and highpass (e.g., residual) images by preferably a sigma filter 200. The lowpass image, containing few details or artifacts, goes through the enhancement path 210. The enhancement path 210 has skin color detection 220, skin color likelihood map filtering 230 and color enhancement 240. The highpass image $I_{HP}$ is formed by subtraction 270 of the lowpass image $I_{LP}$ from the original image. The highpass image, containing details, noise, and artifacts, does not go through the enhancement path 210 and will be added back to the color enhanced lowpass image 250 to generate the enhanced image 260. Therefore, the noise in the highpass imaged is not enhanced in the same manner. In addition, the highpass image can go through coring processing 280 to reduce noise and artifacts. The details of each component in the block-diagram are discussed as follows.

The sigma filter 200 decomposes the input image into the lowpass and highpass images. A suitable sigma filter is published by Lee (J. S. Lee, "Digital image enhancement and noise filtering by use of local statistics," in *IEEE Trans. Pattern Analysis and Machine Intelligence*, Vol. PAMI-2, No. 2, pp. 165-168, March, 1980). The sigma filter utilizes a 1-D or 2-D rectangular window, where the current pixel I(x,y) is at the center of the window. The sigma filter compares all the pixels I(i,j) in the window with the central pixel I(x,y), and averages those pixels whose value differences with the central pixel I(x,y) is within a threshold T. Because this filter drops pixels that are not within the threshold, one may refer to this as a sigma filter. The sigma filter is a nonlinear filter. Mathematically, the output of the sigma filter, $I_{LP}(x,y)$, is calculated by $$I_{LP}(x, y) = \frac{\sum_{(i,j) \in E \& |I(i,j) - I(x,y)| < T} I(i, j)}{N(x, y)} \quad (1)$$

where E is the window; N(x,y) is the count of the pixels in E that satisfy the condition of |I(i,j)−I(x,y)|<T. The parameters of the sigma filter, the widow E and the threshold T, are preferably chosen empirically.

The sigma filter generates the lowpass image $I_{LP}$, and the highpass image is obtained by subtraction 270. Because the sigma filter is a smoothing filter preserving sharp edges, the lowpass image generated by a sigma filter contains few details but contains sharp edges, and the highpass image contains details/noises/artifacts but few sharp edges.

The skin color detection 220 uses a 3D lookup table (LUT) to generate a skin color likelihood map. The three dimensions of the LUT are R, G and B. Each element of the LUT is a scale from 0 to 1 to indicate the likelihood that a color belongs to skin colors. The LUT is built by training, using training set where skin colors are manually segmented. Every pixel of the lowpass image can be given a skin color likelihood score by the LUT and the whole image forms a skin color likelihood map α.

Figure 4:
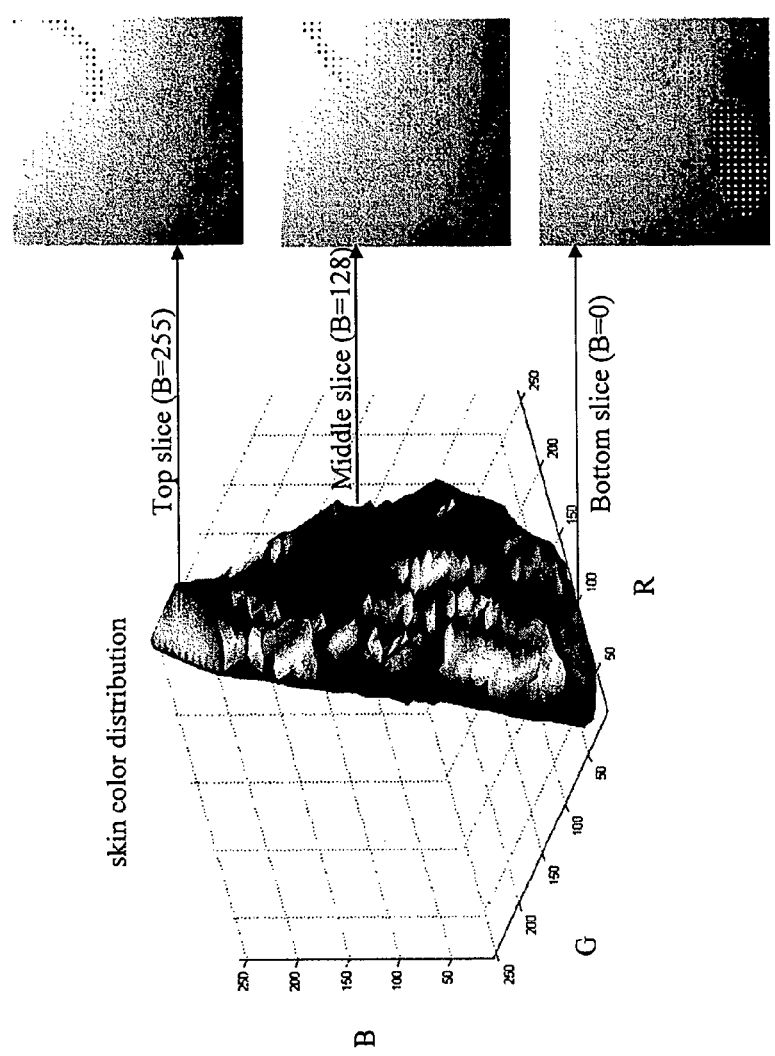
FIG. 4 illustrates a look up table of skin color.

Assuming that R, G and B inputs are 8 bits, the size of 3D LUT is 256×256×256, which is costly to implement directly in expensive hardware. A LUT with that size is also tedious to train. Therefore, 33×33×33 3D LUT is preferably used. The 33 levels of each dimension are 0, 8, 16, 24, 32, 40, 48, 56, 64, 72, 80, 88, 96, 104, 112, 120, 128, 136, 144, 152, 160, 168, 176, 184, 192, 200, 208, 216, 224, 232, 240, 248, 255. A 3D interpolation algorithm, such as tri-linear interpolation, is used to fill all the missing points in the 3D 256×256×256 grid. The 33×33×33 LUT is illustrated in FIG. 4.

The skin colors and non-skin colors are highly overlapped in the sense that any skin colors are not exclusively used by skins and non-skin colors are not exclusively used by non-skin objects either. Consequently, the skin color likelihood map of the input image generated by the above LUT can not avoid misses.

To correct some misses in the skin color likelihood map, one may use spatial information by applying an image-driven nonlinear lowpass filter to the skin color likelihood map in the preferred algorithm. The filter is motivated by the following two facts:

(a) The pixels that are spatially close likely have similar skin color likelihood scores;

(b) The pixels that are close in the color space likely have similar skin color likelihood scores.

Mathematically, the image-driven nonlinear lowpass filter may be defined as $$a_{LP}(x, y) = \frac{\sum_{(i,j) \in E \& |R(i,j) - R(x,y)| < T \& |G(i,j) - G(x,y)| < T \& |B(i,j) - B(x,y)| < T} a(i, j)}{N(x, y)} \quad (2)$$

In the above equation, E is the window; a(i, j) is the skin color likelihood score at (i, j). R(i, j), G(i, j), and B(i, j) define the colors at (i, j). The spatial proximity is defined by window E. The pixels in E are considered to be spatially close to the pixel at (x, y). The color-space proximity is defined by threshold T. The pixels' R, G and B differences with the pixel at (x, y) are all below T are considered to be close in the color space. N(x,y) is the count of the qualified pixels in E that are both spatially close and color-wisely close.

Figure 5:
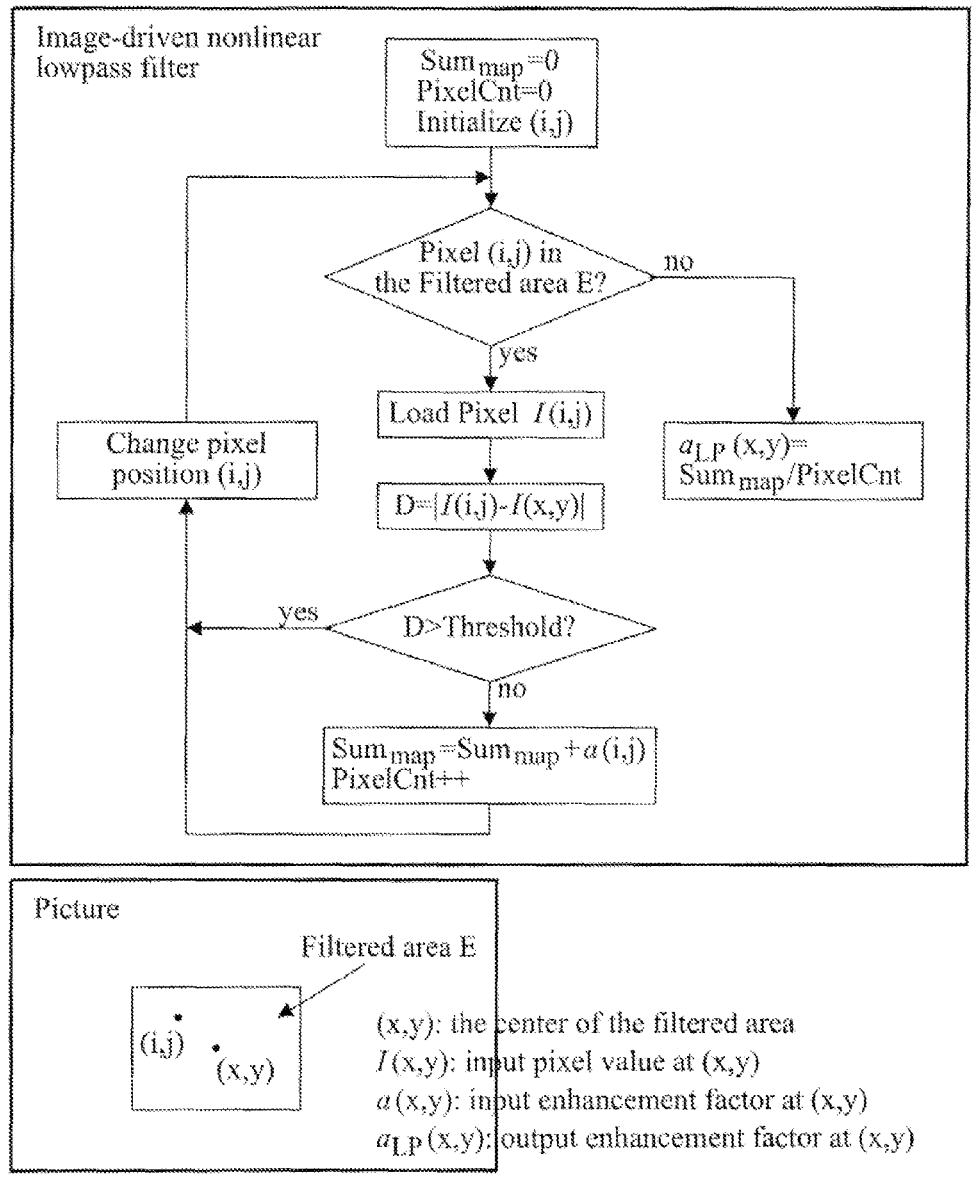
FIG. 5 illustrates a block diagram of an image driven non-linear low pass filter.

The image-driven nonlinear lowpass filter is a variation of the sigma filter. The input of the filter is the skin color likelihood map of the image, but the selection of pixels for averaging is based on the image itself. The spatially close and color-wisely close pixels tend to have the similar skin color likelihood, and their likelihood scores, not there image colors, are averaged. The flow-chart of this filter is shown in FIG. 5.

A pixel with colors defined by [R(x, y), G(x, y), B(x, y)] in the lowpass image is enhanced using a pixel-based color enhancement algorithm with two different sets of parameters, one set for skin colors, and the other for non-skin colors. Two enhanced results from two different parameter sets, [$R_s$(x, y), $G_s$(x, y), $B_s$(x, y)] and [$R_{ns}$(x, y), $G_{ns}$(x, y), $B_{ns}$(x, y)] are mixed linearly according to its skin color likelihood score $\alpha_{LP}$(x, y) to [$R_{EN}$(x, y), $G_{EN}$(x, y), $B_{EN}$(x, y)]. Specifically, the mixing equations may be $$R_{EN}(x,y)=\alpha_{LP}(x,y)R_s(x,y)+(1-\alpha_{LP}(x,y))R_{ns}(x,y)$$

$$G_{EN}(x,y)=\alpha_{LP}(x,y)G_s(x,y)+(1-\alpha_{LP}(x,y))G_{ns}(x,y)$$

$$B_{EN}(x,y)=\alpha_{LP}(x,y)B_s(x,y)+(1-\alpha_{LP}(x,y))B_{ns}(x,y)$$

Figure 6:
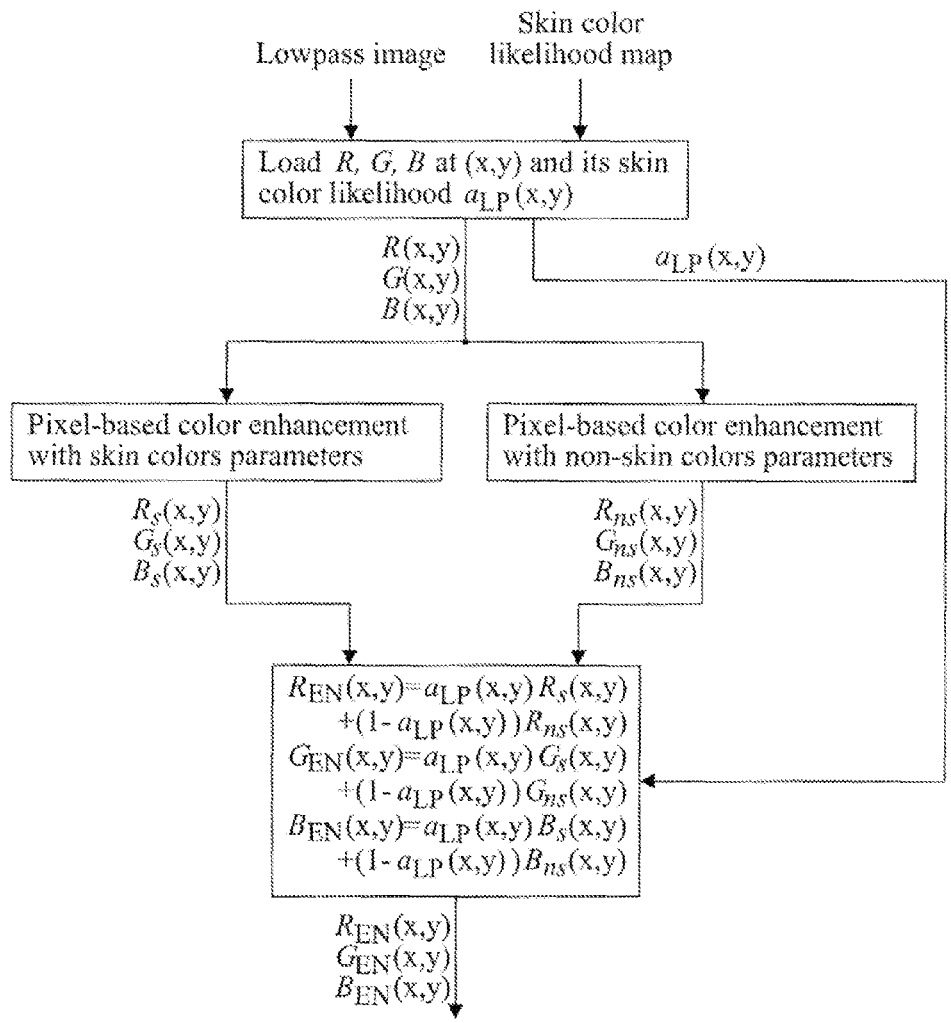
FIG. 6 illustrates a flow chart of color enhancement using skin color likelihood map.

The block-diagram is shown in FIG. 6. Any pixel-based technique can be used for color enhancement.

Figure 7:
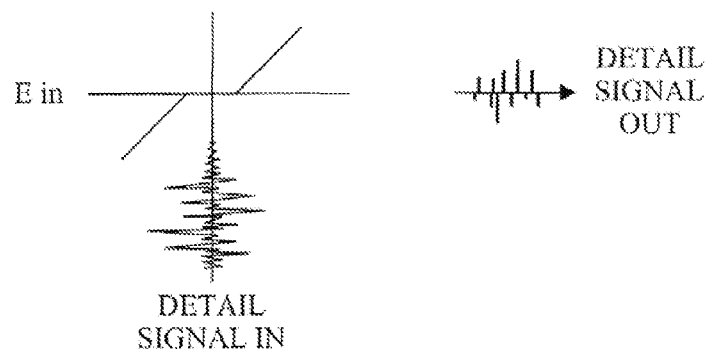
FIG. 7 illustrates an input-output relationship of a coring process.

The highpass image contains details, noise and artifacts. As an option, the highpass image can go through a coring process 280 to reduce noise and artifacts. The input-output relationship of a coring processing is shown in FIG. 7.

Figure 8:
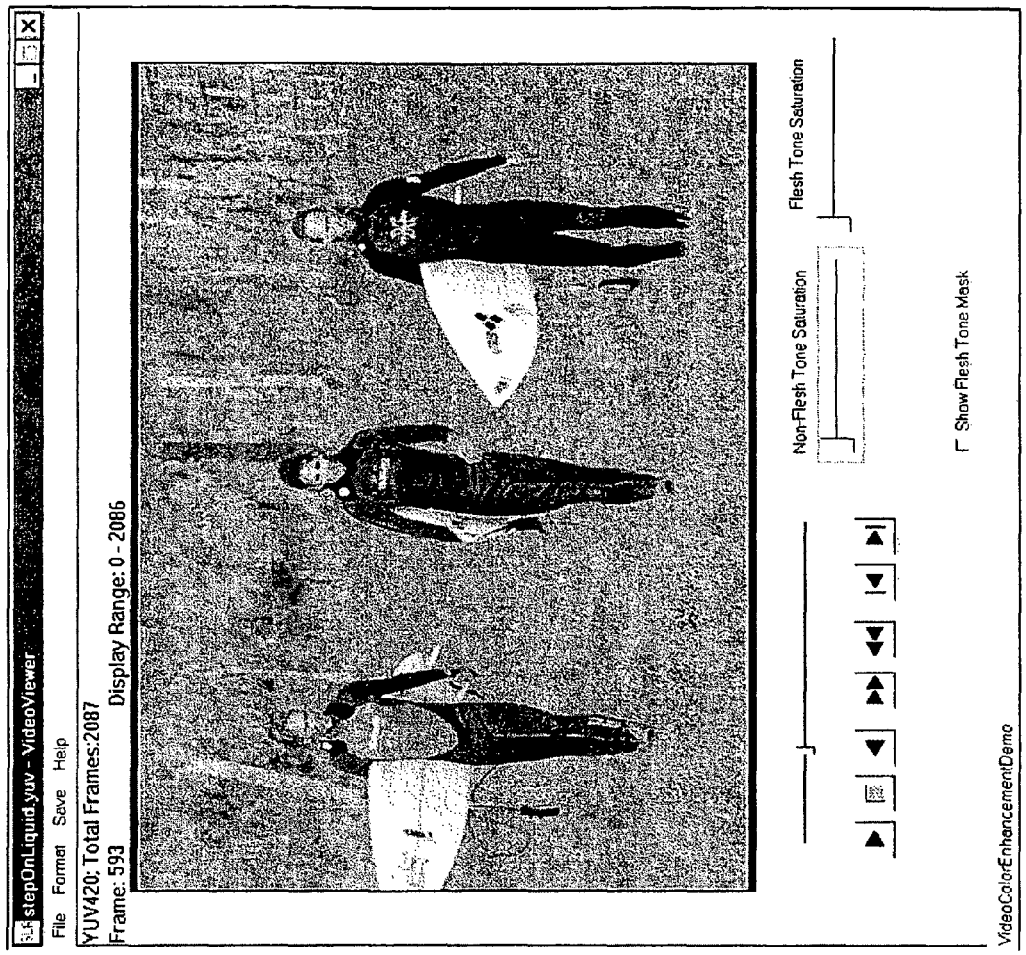
FIG. 8 illustrates a user interface.

One example of the user interface of the embodiment of the preferred embodiment is shown in FIG. 8. The interface has two sliders to let viewers separately adjust the saturation levels of the skin colors ("Flesh Tone Saturation") and non-skin colors ("Non-flesh Tone Saturation"). Although this example only shows the separate saturation adjustments, the preferred embodiment allows other separate parameter adjustments as well, such as hue and/or brightness.

The same idea in the color enhancement technique is may be used in a color gamut mapping technique to map pictorial data from a small color gamut to a big color gamut. Next-generation LCD TVs may feature a big color gamut such as the NTSC gamut. On the other hand, in the foreseeable future, the contents will still be in the HDTV/sRGB format, which is 70% of the NTSC gamut in the XYZ color space. Directly displaying the RGB values defined in the small HDTV/sRGB gamut on the TV with the big NTSC gamut will damage skin colors, resulting in red color shadows, color clipping, etc.

As the color enhancement technique, the color gamut mapping algorithm decomposes the input image into lowpass and highpass images using the same sigma filter. The same skin color likelihood map is generated and processed in the color gamut mapping algorithm. The color mapping is only applied to the lowpass mage as the color enhancement algorithm. Specifically, first, a pixel with colors defined by [R(x, y), G(x, y), B(x, y)] in the lowpass image is mapped using two sets of parameters, one parameter set preserving colors, and the other parameter set expanding colors to the extra area of the big color gamut. Then, the two mapped results [$R_s$(x, y), $G_s$(x, y), $B_s$(x, y)] and [$R_{ns}$(x, y), $G_{ns}$(x, y), $B_n$(x, y)] are combined linearly according to its skin color likelihood score $\alpha_{LP}$(x, y) to [$R_{EN}$(x, y), $G_{EN}$(x, y), $B_{EN}$(x, y)].

Specifically, the mixing equations still are $$R_{EN}(x,y)=\alpha_{LP}(x,y)R_s(x,y)+(1-\alpha_{LP}(x,y))R_{ns}(x,y)$$

$$G_{EN}(x,y)=\alpha_{LP}(x,y)G_s(x,y)+(1-\alpha_{LP}(x,y))G_{ns}(x,y)$$

$$B_{EN}(x,y)=\alpha_{LP}(x,y)B_s(x,y)+(1-\alpha_{LP}(x,y))B_{ns}(x,y)$$

The block-diagram of lowpass image processing is shown in FIG. 9. Finally, the highpass image is added back to generate the color-gamut-mapped image.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

I claim:

1. A method for enhancing the color of an image displayed on a display, said method comprising:
    (a) receiving an image having a plurality of pixels where each of said pixels has a plurality of color components;
    (b) filtering said image with a sigma filter to obtain a base image wherein said base image is characterized by having primarily low frequency components of said image;
    (c) modifying said input image to obtain a residual image by subtracting said base image from said image, wherein said residual image is characterized by having primarily high frequency components of said image;
    (d) filtering said base image with a spatial filter to determine potential skin tone regions and subsequently use a color dynamic range enhancement technique that modifies the differences in similar colors to obtain an enhanced base image such that the modification of said differences is larger in said skin-tone regions than in non-skin-tone regions of said base image;
    (e) creating a resulting image based upon said residual image and said enhanced image.

2. The method of claim 1 wherein said residual image is not filtered.

3. The method of claim 1 including the step of determining a probability that a pixel is in a skin tone region and where said enhancement technique uses said probability to apply a linear combination of a first enhancement for skin-tone regions of said image multiplied by the probability that said pixel is in a skin tone region, and a second enhancement for non-skin-tone regions of said image multiplied by the probability that said pixel is not in a skin tone region.

4. The method of claim 1 wherein said enhanced base image has a modified color gamut.

5. The method of claim 4 wherein said enhanced base image has increased saturation.

6. The method of claim 4 wherein said enhanced base image has decreased saturation.

7. The method of claim 1 where said spatial filter is an image-driven nonlinear lowpass filter that receives as input a skin-color likelihood map and filters said map to identify those skin colors that represent a person's skin.

8. The method of claim 7 where said image-driven nonlinear lowpass filter uses both the spatial and tonal proximity of respective pixels to each other in said skin-color likelihood map to identify those skin colors that represent a person's skin.

* * * * *

UNITED STATES PATENT AND TRADEMARK OFFICE
CERTIFICATE OF CORRECTION

PATENT NO. : 9,143,657 B2
APPLICATION NO. : 11/393404
DATED : September 22, 2015
INVENTOR(S) : Hao Pan Page 1 of 1

It is certified that error appears in the above-identified patent and that said Letters Patent is hereby corrected as shown below:

Col. 5, line 63

Change "$[R_{ns}(x, y), G_{ns}(x, y), B_n(x, y)]$" to read --$[R_{ns}(x, y), G_{ns}(x, y), B_{ns}(x, y)]$--.

Signed and Sealed this
Twenty-first Day of June, 2016

Michelle K. Lee
*Director of the United States Patent and Trademark Office*